United States Patent [19]
Leonard et al.

[11] Patent Number: 5,227,846
[45] Date of Patent: Jul. 13, 1993

[54] SCANNING EXPOSURE DEVICE

[75] Inventors: Jacques V. Leonard; Alex M. Van der Poel, both of Antwerpen, Belgium

[73] Assignee: AGFA-Gevaert N. V., Mortsel, Belgium

[21] Appl. No.: 664,857

[22] Filed: Mar. 5, 1991

[30] Foreign Application Priority Data

Mar. 21, 1990 [EP] European Pat. Off. ........ 90200670.9

[51] Int. Cl.⁵ ............................................. G03G 15/00
[52] U.S. Cl. ..................................... 355/234; 355/230
[58] Field of Search ................. 355/234, 230, 231, 75, 355/76, 50, 51; 358/496

[56] References Cited

U.S. PATENT DOCUMENTS

| | | | |
|---|---|---|---|
| 3,737,223 | 6/1973 | Yamamoto | 355/75 X |
| 3,790,272 | 2/1974 | Knechtel et al. | 355/51 |
| 3,993,406 | 11/1976 | Zeuthen | 355/75 X |
| 4,042,301 | 8/1977 | Heidrich et al. | 355/75 |
| 4,129,374 | 12/1978 | Uchida et al. | 355/234 |
| 4,340,297 | 7/1982 | Tamura et al. | 355/234 |
| 4,551,010 | 11/1985 | Miyashita et al. | 355/75 X |
| 4,647,183 | 3/1987 | Hohjoh | 355/50 X |
| 4,857,956 | 8/1989 | Honda | 355/234 |

FOREIGN PATENT DOCUMENTS 0046270 3/1982 Japan .................... 355/75

Primary Examiner—A. T. Grimley
Assistant Examiner—Robert Beatty
Attorney, Agent, or Firm—William J. Daniel

[57] ABSTRACT

A scanner having a carriage (13) with a glass plate (52) for supporting an original document to be scanned while moving past an exposure opening, in which the glass plate is vertically displaceable against yieldable supporting springs mounted on a frame (47) of the carriage and is downwardly biased into contact with two lateral guide wheels (71,72) that are provided near the lateral ends of the exposure opening.

12 Claims, 3 Drawing Sheets

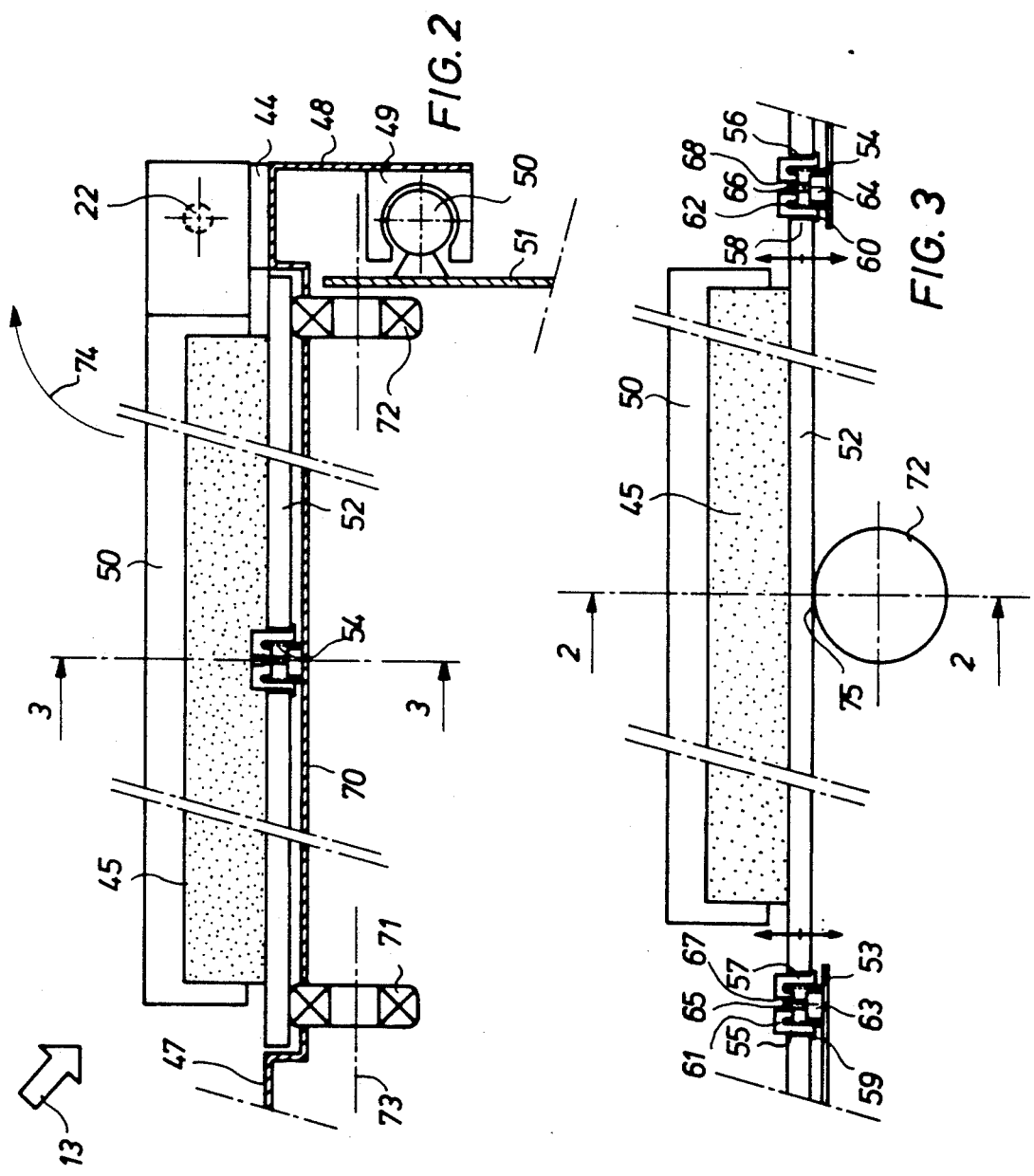

SCANNING EXPOSURE DEVICE

BACKGROUND OF THE INVENTION

1. Field of the invention

The present invention relates to a scanning exposure device for scanning-wise exposure of the image of an original document onto light-sensitive means.

2. Description of the prior art

Scanning exposure devices are well-known in the art of electrophotography and image-reproduction and image-processing. One known form of this kind of device is that used in copiers which have a glass copy board onto which the original document is placed with the image facing downwardly. The copy board is fitted in a carriage which is displaceable over the top of the copier, and a transverse zone of the image is projected through a slotlike opening in the top wall of the copier onto a photoconductor drum by means of an optical projection system. The photoconductor drum is driven in relation to the movement of the copyboard so that the drum, which previously has been uniformly charged, becomes progressively image-wise discharged. The resultant charge image is developed by means of a suitable toner mixture which is then transferred onto a final support, such as a paper sheet, or a transparent foil in the case of the production of transparencies for overhead projection.

Another known form of a scanner is in image processing systems, in which an original document is linewise exposed onto a photosensitive CCD (charge-coupled-device) array in order to produce an electronic line signal which can be digitized and then manipulated for image processing.

While the quality demands are moderate in the field of copiers they are on the contrary high in the fields of digital image processing, and the production of prints or printing plates for the graphic industry, etc.

One feature that plays an important role in the reproduction of an document by means of an optical projection system, is the perfect location of the original document image in the object plane of the projection system. In the case of a scanning exposure wherein the lens system remains stationary, this means that the original document must be displaced bodily during the exposure in a direction which is normal to the scanning line, or the scanning zone. To that end the original document is supported by a glass plate which fits in a carriage which is provided with bearings which allow the displacement of the frame along guide rods or rails.

This known guide construction offers a limited precision which gives acceptable results in the field of copying. Where, however, higher demands are imposed on the precision of the location which is taken by the image-portion which is being reproduced, the precision of the guidance system, the precision of the glass frame, etc. must be high which causes a considerable increase of the costprice of these components.

A scanning device of the described type is disclosed in U.S. Pat. No. 3,737,223.

Another important point is the illumination intensity of the original document which varies as the original document moves out of the object plane. These variations are relatively important since in a scanner the lamps for the illumination are disposed close to the original document, and thus even small variations of the axial position of the original document cause relatively large variations of the illumination strengh. We have found that this phenomenon is particularly disturbing in scanners in digital image processing systems.

SUMMARY OF THE INVENTION

Objects of the Invention

It is the object of the present invention to provide a scanning exposure device with an original document holder which is arranged for translation over an exposure opening in the top of a light-tight housing in which an optical projection system is contained for projecting a part-image of the moving original document onto light-sensitive means, and in which the original document holder comprises a glass frame into which a clear glass plate is provided for supporting the original document, wherein the control of the location of the glass plate such that the image of the original document supported thereby lies exactly in the object plane, is achieved in a simple way resulting in a less expensive arrangement.

Statement of the Invention

According to the present invention, a scanning exposure device with an original document holder which is arranged for translation over an elongated exposure opening in the top wall of a light-tight housing in which an optical projection system is provided for projecting a part-image of the moving original document onto light-sensitive means in the housing, wherein the original document holder comprises a frame into which a clear glass plate is provided for supporting the original document, is characterised thereby that the glass plate is mounted in the frame for limited displacement in the vertical direction, that two glass plate guide surfaces are provided near the lateral ends of the exposure opening for contacting the underside of the glass plate at opposed marginal zones, and that means is provided for biasing the glass plate such that the plate is urged in firm contact with the two guide surfaces during its scanning movement over the housing, thereby to keep the portion of the original document being exposed accurately in the object plane of the projection system during the exposure.

According to a preferred embodiment of the invention, the guide surfaces are formed by the peripheral surface of rollers which are in rolling contact with the glass plate.

The scanning exposure device according to the invention may be used in a scanner with a CCD array for digital image processing as mentioned already, but the inventive device may be used as well in photocopy-type apparatus as mentioned but which are used for the production of printing plates in the graphic industry, rather than for making copies. The latter application will be described by way of example in the description hereinafter, but it will be understood that the invention is not limited to this particular application.

According to a suitable embodiment of the invention, the means for biasing the glass plate such that the plate is urged in firm contact with the two guide surfaces is formed by a cover which keeps the original document in firm contact with the glass plate. This cover may be one which is hingedly connected to the frame and which bears a resilient cushion or the like at its underside, but this cover may be also a rubberlike flap as known in the art.

The device according to the invention may be provided with means for preventing the glass plate from tipping or tilting during its movement over the guide surfaces.

Such means may be formed by spring means which are provided between the glass plate and the frame and which ensures that the glass plate is in a balanced position, i.e. which runs nearly parallel to the frame, which yet allowing small displacements of the glass plate in order to maintain contact at any time with the guide surfaces.

The mentioned means offer the advantage that the glass plate lies nearly horizontal when the cover of the device is opened.

The displaceable mounting of the glass plate in the frame as described, should be such that lateral displacement of the glass plate with respect to the frame are almost zero, since an uncontrolled displacement of the glass plate in a lateral direction, causes a corresponding lateral displacement of the image of the original document that is positioned on the plate.

It has been shown that the position of the glass plate in its own plane is very well determined by the resilience imparted by the contact with a flexible cushion carried within a cover which is hingedly connected to the frame. In the opened position of the cover of the device, on the contrary, this control is not operative. Therefore, the lateral position of the glass plate may when the cover is open, be kept under control according to one embodiment of the invention by means of small pins that project upwardly from the frame and that slidingly fit in corresponding bores of the glass plate at marginal zones that are located outside of the image area.

According to a suitable form of the invention, the functions of the mentioned spring means for preventing the glass plate from tilting, and of the control of the lateral position of the glass plate in the frame, are accomplished by cup-like bushings which fit in corresponding bores in the glass plate, said bushings having a bore for co-operation with guide pins on the frame, thereby to form a vertical guide, and said bushings also forming a housing for the location of helical compression springs.

BRIEF DESCRIPTION OF THE DRAWINGS

The invention will be described hereinafter by way of example with reference to the accompanying drawings, wherein:

FIG. 2 is a transverse section on line 2—2 of FIG. 3 of the glass frame of the apparatus according to FIG. 1, FIG. 3 is longitudinal section on line 3—3 of FIG. 2.

DETAILED DESCRIPTION OF THE INVENTION

Figure 1:
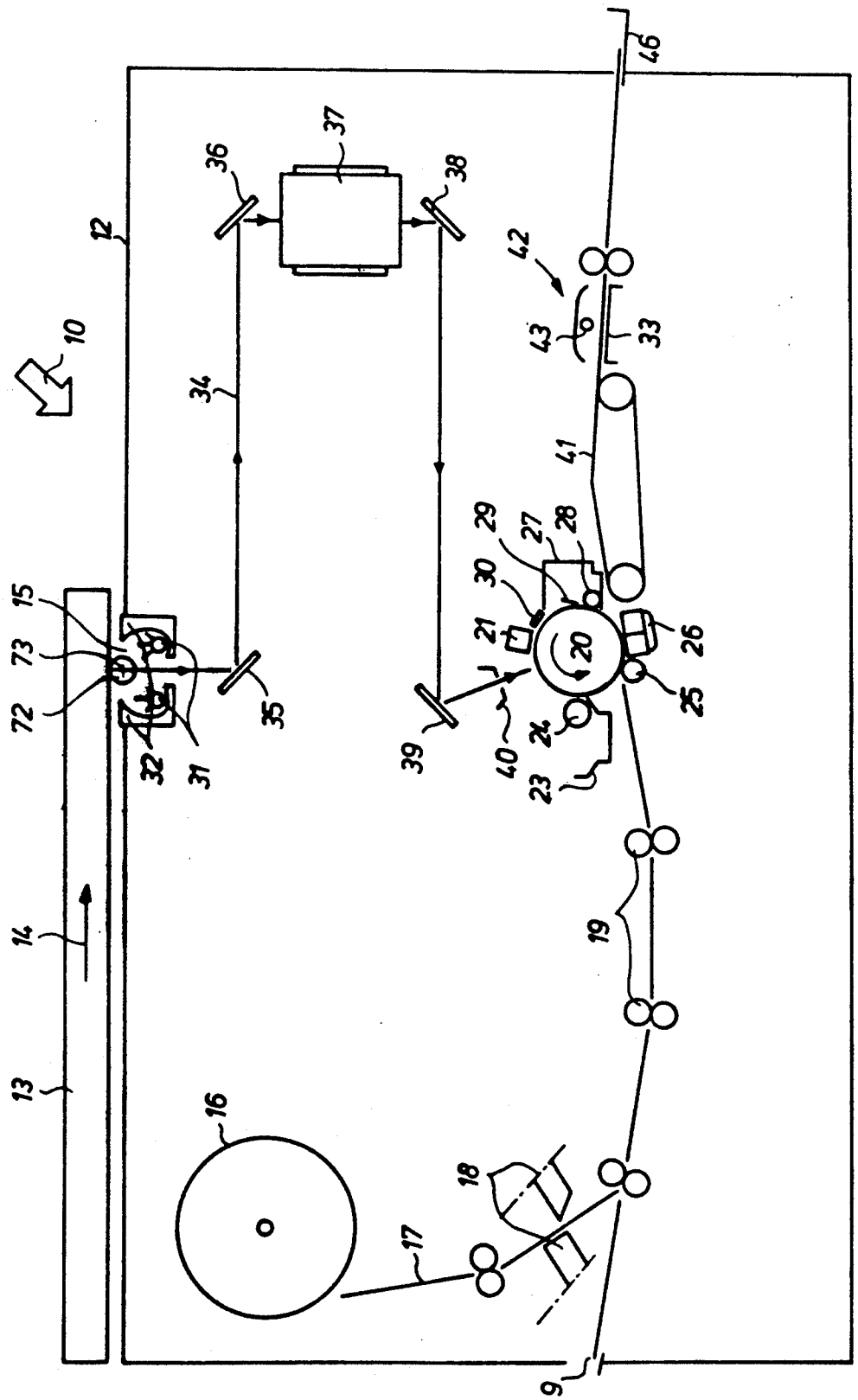
FIG. 1 is a diagrammatic illustration of one embodiment of a device according to the invention in an electrophotographic apparatus.

Referring to FIG. 1 which illustrates the different functions of an electrophotographic apparatus which is used in present example for the production of offset printing plates, the apparatus 10 comprises generally a light-tight housing 12 and an original document holder in the form of a carriage 13 which is displaceable in the direction of the arrow 14 over a slotlike exposure opening 15 in the top wall of the housing.

In the housing, there is provided a supply roll 16 of subbed film 17 which may be cut by knives 18 into receptor sheets which are transported by roller pairs 19 towards a photoconductor drum 20.

The housing 12 has an opening 9 through which film sheets may be directly introduced into the apparatus, e.g. in case a few plates must be made with a format that differs from that of sheets cut from the roll 16.

Angularly spaced around the drum 20 there are provided a corona station 21 for the uniformly electrostatically charging of the surface of the drum, a developing station 23 for the application of a toner mixture to the drum by means of a magnet roller 24 in view of the development of the electrostatic image on the drum that remains after the image-wise exposure of the drum, a pressure roller 25, a corona station 26 for the transfer of the developed toner image onto the sheet cut from the roll 16, a cleaning station 27 with a roller 28 and a blade 29, and finally a flooding exposure station 30 for the uniform illumination of the drum after its cleaning in order to obtain a complete electric discharge of its surface.

A detailed description of a suitable embodiment of a developing station for use in the present apparatus may be found in our co-pending EPO application No. 90 200 122.1 entitled "Electrostatic latent image developing device" filed on Jan. 17, 1990 and corresponding U.S. application Ser. No. 640,169, filed Jan. 11, 1991.

The illumination of the original document in view of its image-wise exposure occurs by two rod-like lamps 31 and corresponding reflectors 32. The exposed part-image of the original document follows an optical path 34, via mirrors 35 and 36, the lens unit 37, and the mirrors 38 and 39. An image window 40 limits the width of the image beam to a few millimeters. The sheet bearing the toner image that has been transferred from the drum is conveyed by a vacuum belt 41 to a fixing station 42 that comprises an IR-heater 43 for the toner image and a conductive back heater 33 for the sheet. The finished sheet is finally received in the tray 46, and may then occasionally receive an extra treatment to make it suited for use as an offset printing plate.

The carriage 13 is illustrated in detail in FIGS. 2 and 3, FIG. 2 being a transverse cross-section on line 2—2 of FIG. 3 and FIG. 3 being a longitudinal section on line 3—3 of FIG. 2.

Figure 4:
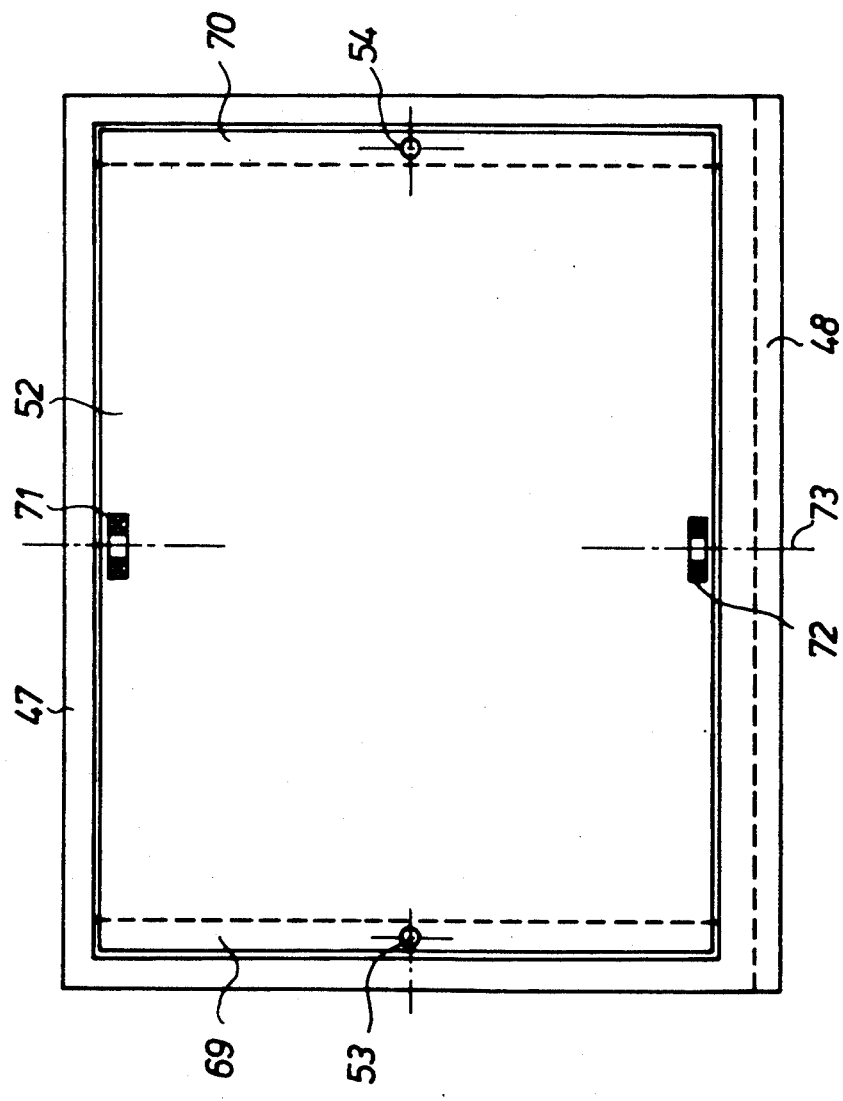
FIG. 4 is a top view on a reduced scale of the plate carrying frame and the glass plate.

The carriage is substantially composed of a rectangular frame 47 that has on one longitudinal side an L-like downward extension 48 into which are fitted axial bearings 49 which co-operate with a guide rod 50, which extends over the full length of the apparatus and is fitted to a side wall 51 thereof. On top of the portion 48 there are provided two supports 44, only one being visible in FIG. 2, between which a document cover C is hingedly connected in hinging points 22. The cover is a rectangular member, suitably made from plastic by injection molding, the hollow underside of which is provided with a biasing member in the form of a cushion 45 of resilient foam. A clear glass plate 52 cut from so-called float glass, rests freely within a recessed portion of the frame 47, and is kept nearly horizontal by two helical compression springs 53, 54 that prevent the plate from excessive tilting on the rollers 71, 72. The springs are provided at the centre of the leading and the trailing margins of the glass plate, as shown in FIGS. 3 and 4.

The mounting of the springs is done by means of hood-like or inverted cup-like bushings 55, 56 that are glued in corresponding bores 57, 58 drilled in the glass plate. The bushings have an outer flange 59, 60 at the underside, and an inner collar 61, 62 at the topside. The underside of the springs is centered by means of rings 63, 64 that are slid over vertical pins 65, 66 fitted to recessed end lips 69, 70 of the frame. The inner collars 61, 62 have bores 67, 68 that co-operate with the pins to form axial guides for the glass plate whereby the plate can undergo displacements in a vertical direction only.

Figure 5:
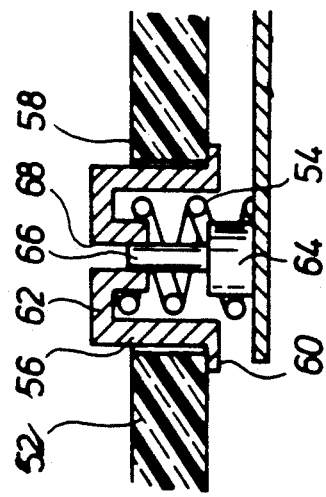
FIG. 5 is an enlarged view of a cap-like bushing, showing the bushing in uncompressed condition.

The bushing 56 is illustrated on an enlarged scale in FIG. 5.

The inventive control of the position of the glass plate to ensure that the image on its upper surface lies exactly in the object plane of the optical projection system of the apparatus, is achieved by means of two guide surfaces in the form of idler wheels 71, 72. The guide wheels have a convex running surface, and their shaft (not shown) is connected to a vertical wall portion of the housing at the lateral ends of the exposure opening 15. The axis 73 of the rollers intersects the optical axis 34 of the projection system as shown in FIG. 1.

In the operation of the apparatus, the operator opens the document cover 50 in the direction of the arrow 74 in FIG. 2, and places an original document with the image-side facing downwardly on the glass plate 52.

Then the operator closes the cover with the consequence that the glass plate with the original document thereon is slightly lowered in the frame, because the cover rests on the plate through the intermediary of the resilient cushion 45, so that the springs 53 and 54 become slightly compressed. Conversely, when the cover C is raised, the plate rises slightly. The displacement of the plate is indicated in exaggerated fashion in FIG. 3 by the arrows designated A.

As a consequence of these opposed biasing forces, the glass plate is so to say floating, the equilibrium position of the plate being such that the free location of the lower surface of the glass plate would be below a horizontal tangent plane to both rollers at the top thereof. However, the two rollers 71 and 72 urge the plate slightly upwardly, the lower surface of the plate forming a tangent plane to the rollers.

It should be understood that in the described arrangement the glass plate performs a limited tilting movement about a transverse line 75 which is the contact line between the plate and the rollers and which is illustrated by a point in FIG. 3, but said tilting is so insignificant that its effect is totally neglectable for what concerns the exposure of the image of the original document.

Movement of the carriage during the scanning causes the transverse zone of the image which is being projected onto the photoconductive drum, to be always located exactly in the object plane of the optical system, which is the tangent plane to the top of the rollers 71, 72 raised over a distance which corresponds with the thickness of the glass plate.

Thus, independent from inaccuracies of the frame structure or play in the carriage bearing system 49, 50, the position of the glass plate is always correct as a consequence of the contact of the underside of the plate with the rollers 71, 72.

The tolerances for the flatness and/or the thickness of standard float glass plates are so strict that from this standpoint no influence is expected that could effect the accuracy of positioning of the image in the object plane of the reproduction system. During the scanning of the original document, the drum 20 rotates in synchronism with the displacement of the carriage 13 that bears the original document, so that a 1:1 exposure of the original document is obtained.

One element that may play an important role in the perfect synchronism between the advance of the original document and that of the receptor sheet is the roller 25 which firmly urges the receptor sheet in contact with the photoconductor drum 20. In a suitable embodiment, this roller may have a resilient lining and two small rigid end sections, the diameter of which is very slightly larger than that of the central resilient section. The roller is resiliently biased against the photoconductor drum so that by contact of its end sections with the drum surface, it rotates in perfect synchronism with the drum. As a receptor sheet is fed in the nip between the resilient section of the roller and the drum, the sheet becomes gently but yet firmly urged to the drum surface under the biasing by the resilient layer of the roller.

Further, it may be advantageous to arrange the path of the receptor sheet towards the drum such that there exists a certain contact angle of the sheet with the drum. The angular extent of this contact may be obtained by a suitable positioning of the roller 25, but also by the provision of suitable guide plates for the receptor sheet.

It will be understood that the invention is not limited to the embodiment described hereinbefore.

The resilient biasing of the glass plate towards the guide rollers may occur by other means than the illustrated resilient cushion.

The control of the glass plate to limit its tilting may occur by other means than the illustrated helical springs 53 and 54. For instance, the glass plate may be fitted in the frame through the intermediary of at least two leaf springs located in a horizontal plane and connecting a corner zone of the glass plate with the adjacent corner zone of the frame. The flexibility of the leaf springs is sufficiently high for allowing the glass plate to carry out small vertical displacements, but the resistance of the leaf springs against deformation in the horizontal plane is high, so that they perform a good control of the lateral position of the glass plate. Thus, the latter spring control also performs the functions of the guiding pins 65 and 66 described hereinbefore.

The biasing of the glass plate to limit its tilting may also occur by other spring types, such as conical spiral-wound or leaf-type springs, by elements of resilient or foamed plastic, etc.

The projecting lens may be movable along the optical axis for varying the projection magnification, and the speed ratio of the drum with respect to the carriage may be accordingly adjusted.

We claim:

1. In a scanning exposure device having an original document holder which is adapted for translation with a document carried therein in one direction during exposure over an elongated exposure opening in the top wall of a light-tight housing enclosing an optical projection system for projecting a part-image of the moving original document onto light-sensitive means in the housing, in combination, the improvement wherein said original document holder comprises a transparent generally rigid rectangular glass plate on which the document rests, a rectangular plate-carrying frame translatable along a generally fixed linear path over said exposure opening, yieldable means on said frame engaging a first pair of opposed marginal regions of said plate in order to resiliently support the plate for limited independent bodily vertical movement relative to said frame while maintaining the plate in substantially planar position in said frame, guide roller means disposed on a single fixed axis beneath said plate and having the peripheral surface thereof adapted when the plate is displaced downwardly against the yieldable plate support means to make direct supporting contact with the under surface of said plate as the plate translates during exposure, and means effective during exposure for resiliently pressing against the top surface of the plate and any document resting thereon to thereby displace said plate downwardly against the yieldable support means and bias the same in its planar position into contact with the guide roller peripheral surface.

2. A scanning exposure device according to claim 1, which includes means for controlling the lateral position of the glass plate in the plate-carrying frame.

3. A scanning exposure device according to claim 1, wherein the light-sensitive means is formed by a photoconductor drum (20).

4. The scanning device of claim 1 wherein said means for resiliently pressing against the plate comprises a cover swingably mounted on said frame above said plate for movement between an open loading position and a closed exposure position covering said plate and resilient means carried within said cover for pressing against the upper plate surface in said closed position.

5. The scanning device of claim 1 wherein said axis of the guide roller means is disposed between the fixed linear path and said optical projection system, and wherein said first pair of opposed marginal regions extend generally parallel to said axis and constitute the leading and trailing ends of the plates during its translation and said plate also has a second pair of opposed marginal regions along its sides generally perpendicular to said axis, said yieldable means engages the parallel opposed marginal regions, and said guide roller means comprises two axially separated opposed guide rollers, one adjacent each of two opposite sides of said frame lateral of its direction of movement, with their peripheries beneath the perpendicular opposed side marginal regions of the plate.

6. The scanning device of claim 1 wherein said first pair of opposed marginal regions extend generally parallel to said axis and constitute its leading and trailing ends of the plate during its translation and said plate also has a second pair of opposed marginal regions along its sides generally perpendicular to said axis and said frame includes opposed lips extending beneath portions of the parallel opposed marginal regions of said plate and the yieldable plate support means are mounted on said opposed lips.

7. A scanning exposure device according to claim 6, wherein said yieldable plate support means is formed by vertically disposed compression springs which rest at their lower ends on the opposed lips of said frame.

8. A scanning exposure device according to claim 7, wherein each compression spring has a top end, said glass plate has in the parallel opposed marginal regions thereof a bore corresponding to each said compression spring, a corresponding bushing is seated in each of said bores and each bushing has a top end in contact with the top end of the corresponding compression spring.

9. A scanning exposure device according to claim 8 wherein each bushing has a peripheral flange in contact with said glass plate surrounding a corresponding one of said bores.

10. A scanning exposure device according to claim 8 wherein each of said bushings is generally hollow and has at its top end a projection on its interior in engagement with the top end of the corresponding compression spring.

11. A scanning exposure device according to claim 8 wherein each of said bushings has a central axis and a bore therein coaxial with said central axis and said plate-carrying frame carries upstanding pins corresponding to said bushings, each of said pins being fixed at its lower end on the frame and having an upper end fitting in telescoping relation in the coaxial bore of the corresponding bushing for limiting the bushing to generally axial movement.

12. A scanning exposure device according to claim 11 wherein said compression springs are generally cylindrical coil springs and each of said upstanding pins has adjacent its lower end a ring partially telescoping with one end of the corresponding one of said coil springs for centering the same.

* * * * *